Oct. 13, 1925.　　　　1,556,878

G. E. PRITCHARD

ADJUSTABLE SPROCKET WHEEL

Filed Feb. 9, 1924

G. E. Pritchard, Inventor

Patented Oct. 13, 1925.

1,556,878

UNITED STATES PATENT OFFICE.

GEORGE EDWARD PRITCHARD, OF ELIZABETH CITY, NORTH CAROLINA.

ADJUSTABLE SPROCKET WHEEL.

Application filed February 9, 1924. Serial No. 691,841.

*To all whom it may concern:*

Be it known that I, GEORGE E. PRITCHARD, a citizen of the United States, residing at Elizabeth City, in the county of Pasquotank and State of North Carolina, have invented a new and useful Adjustable Sprocket Wheel, of which the following is a specification.

This invention relates to sprocket wheels and the object thereof is to so construct a wheel that it may be enlarged to compensate for wear in the chain which greatly prolongs the life of the chain.

Another object is to provide an expansible sprocket wheel equipped with improved chain retaining means.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawing:—

Figure 1:
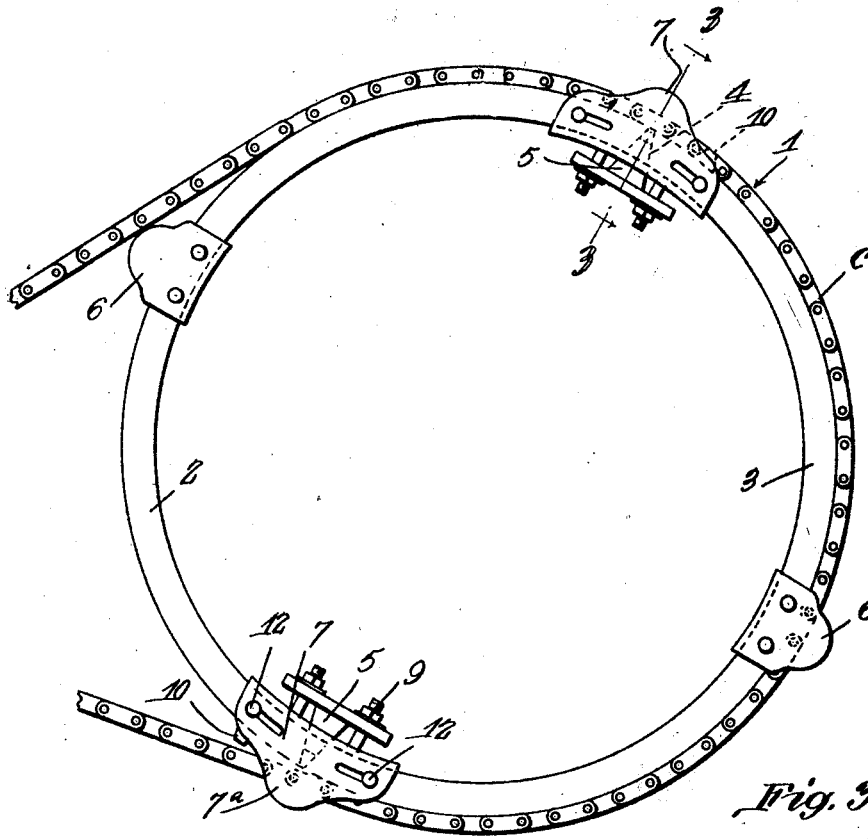
Figure 1 represents a side elevation of a sprocket wheel constructed in accordance with this invention with a chain shown mounted thereon.
Figure 2:
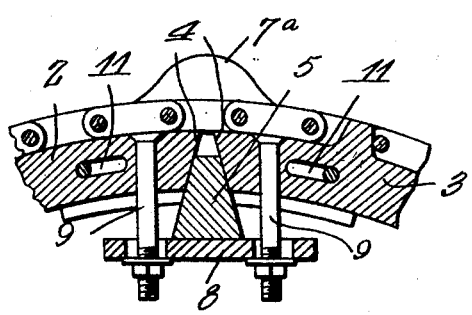
Fig. 2 is a detail sectional view showing the means for expanding the rim of the sprocket wheel.
Figure 3:
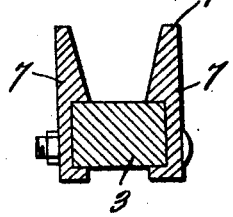
Fig. 3 is a detail transverse section.

The wheel rim 1 constituting this invention is shown constructed of two sections 2 and 3 the meeting ends of which are beveled as shown at 4 in Fig. 2 said ends being inclined downwardly and inwardly to receive between them wedge-shaped spreaders 5. These spreaders 5 are carried by a yoke or plate 8 mounted on transversely spaced bolts 9 carried by the adjacent ends of the sections 2 and 3 so that when the nuts on the bolts are tightened up the plate 8 will be moved inwardly forcing the spreader 5 between the section ends of the sprocket and correspondingly increase the size of the sprocket. The sprocket sections are each equipped with a tooth 10 arranged diametrically opposite so that the teeth will be maintained the same distance apart when the sprocket sections are adjusted, it being of course understood that these teeth are for the purpose of being engaged with the sprocket chain C.

Each of the sprocket sections is provided with a plurality of chain retaining lugs 6 arranged in pairs on opposite faces of the rim of the sprocket and which project beyond the periphery thereof to prevent the chain from moving laterally off the wheel rim. Plates 7 connect the meeting ends of sections 2 and 3 being secured thereto by bolts 12 passing through longitudinally extending slots 11 formed in said section ends and through similar slots 12ª in plates 7. The slots 11 permit the sections to be moved toward and away from each other. The plates 7 perform the double function of connectors for the section ends and as chain retaining means, said plates having lugs 7ª projecting radially beyond the perimeter of the wheel.

It will be obvious that when the spreaders 5 are forced outwardly between the ends of the sections 2 and 3 the size of the sprocket will be increased to compensate for wear in the chain C which operates over the wheel.

I claim:—

1. A sprocket wheel rim split transversely with the ends thereof beveled from the inner toward the outer face, and a wedge-shaped spreader located between said ends and insertible from the inside and having means for adjusting it to vary the size of the wheel.

2. A sprocket wheel rim split transversely with the ends thereof beveled to form a space the walls of which diverge inwardly, a wedge-shaped spreader located between said ends, and means for adjusting said spreader to vary the size of the wheel.

3. A sprocket wheel rim composed of a plurality of sections the meeeting ends of which are beveled and diverge inwardly, wedge-shaped spreaders located between said ends, plates on which said spreaders are mounted, bolts connecting said plates with the adjacent ends of the wheel sections, nuts on said bolts to force said plates toward or away from the wheel whereby the spreaders are projected or retracted, and connectors having a pin and slot connection with the ends of said sections to permit the sections to be moved toward or away from each other.

In testimony that I claim the foregoing as my own, I have hereto affixed my signature.

GEORGE EDWARD PRITCHARD.